US012021207B2

(12) United States Patent
Smith

(10) Patent No.: US 12,021,207 B2
(45) Date of Patent: Jun. 25, 2024

(54) FLOTATION METHOD FOR RECOVERING LITHIUM-ION BATTERY CATHODE MATERIAL FROM RECYCLED LITHIUM-ION BATTERIES AND SCRAP

(71) Applicant: American Hyperform, Inc., Philadelphia, PA (US)

(72) Inventor: William Novis Smith, Philadelphia, PA (US)

(73) Assignee: American Hyperform, Inc., Philadelphia, PA (US)

( * ) Notice: Subject to any disclaimer, the term of this patent is extended or adjusted under 35 U.S.C. 154(b) by 0 days.

(21) Appl. No.: 18/200,088

(22) Filed: May 22, 2023

(65) Prior Publication Data

US 2023/0387489 A1     Nov. 30, 2023

Related U.S. Application Data

(60) Provisional application No. 63/345,175, filed on May 24, 2022.

(51) Int. Cl.
| | |
|---|---|
| *H01M 10/05* | (2010.01) |
| *C22B 1/24* | (2006.01) |
| *C22B 7/00* | (2006.01) |
| *C22B 23/02* | (2006.01) |
| *H01M 4/38* | (2006.01) |
| *H01M 4/58* | (2010.01) |
| *H01M 10/0525* | (2010.01) |

(Continued)

(52) U.S. Cl.
CPC .............. *H01M 10/54* (2013.01); *C22B 1/24* (2013.01); *C22B 7/005* (2013.01); *C22B 23/02* (2013.01); *H01M 4/38* (2013.01); *H01M 4/5825* (2013.01); *H01M 10/0525* (2013.01); *H01M 2004/028* (2013.01)

(58) Field of Classification Search
CPC ...... H01M 10/54; H01M 4/38; H01M 4/5825; H01M 10/0525; H01M 2004/028; C22B 1/24; C22B 7/005; C22B 23/02
USPC .......................................................... 429/49
See application file for complete search history.

(56) References Cited

U.S. PATENT DOCUMENTS

| | | |
|---|---|---|
| 11,142,466 B2 | 10/2021 | Bourassa et al. |
| 11,932,554 B2 | 3/2024 | Smith |
| 2011/0250499 A1 | 10/2011 | Hiratsuka |

(Continued)

*Primary Examiner* — Raymond Alejandro
(74) *Attorney, Agent, or Firm* — Blanchard Horton PLLC

(57) ABSTRACT

A flotation method for separating cathode material from anode and other carbon materials is described. The cathode material may be that including lithium, nickel, and cobalt or that including lithium iron phosphate. The starting material for the flotation process is conventional black mass as recovered from fractured lithium-ion batteries and lithium-ion battery production scrap. The fractured lithium-ion batteries may originate from spent batteries including used batteries and/or out of specification new production batteries. A very fine mesh screening preferably is used to remove interfering binder from the black mass powder prior to froth flotation, preferably in combination with a hydrophilic depressant to enhance separation of the cathode material from the anode and other carbon materials present in the black mass. The separated cathode and anode materials recovered from the method may be used directly or augmented with additional lithium to form new LIB cathodes, anodes, and batteries.

43 Claims, 1 Drawing Sheet

(51) Int. Cl.
*H01M 10/54* (2006.01)
*H01M 4/02* (2006.01)

(56) References Cited

U.S. PATENT DOCUMENTS

2017/0200989 A1* 7/2017 Sloop .................... H01M 4/485
2023/0322578 A1 10/2023 Smith

* cited by examiner

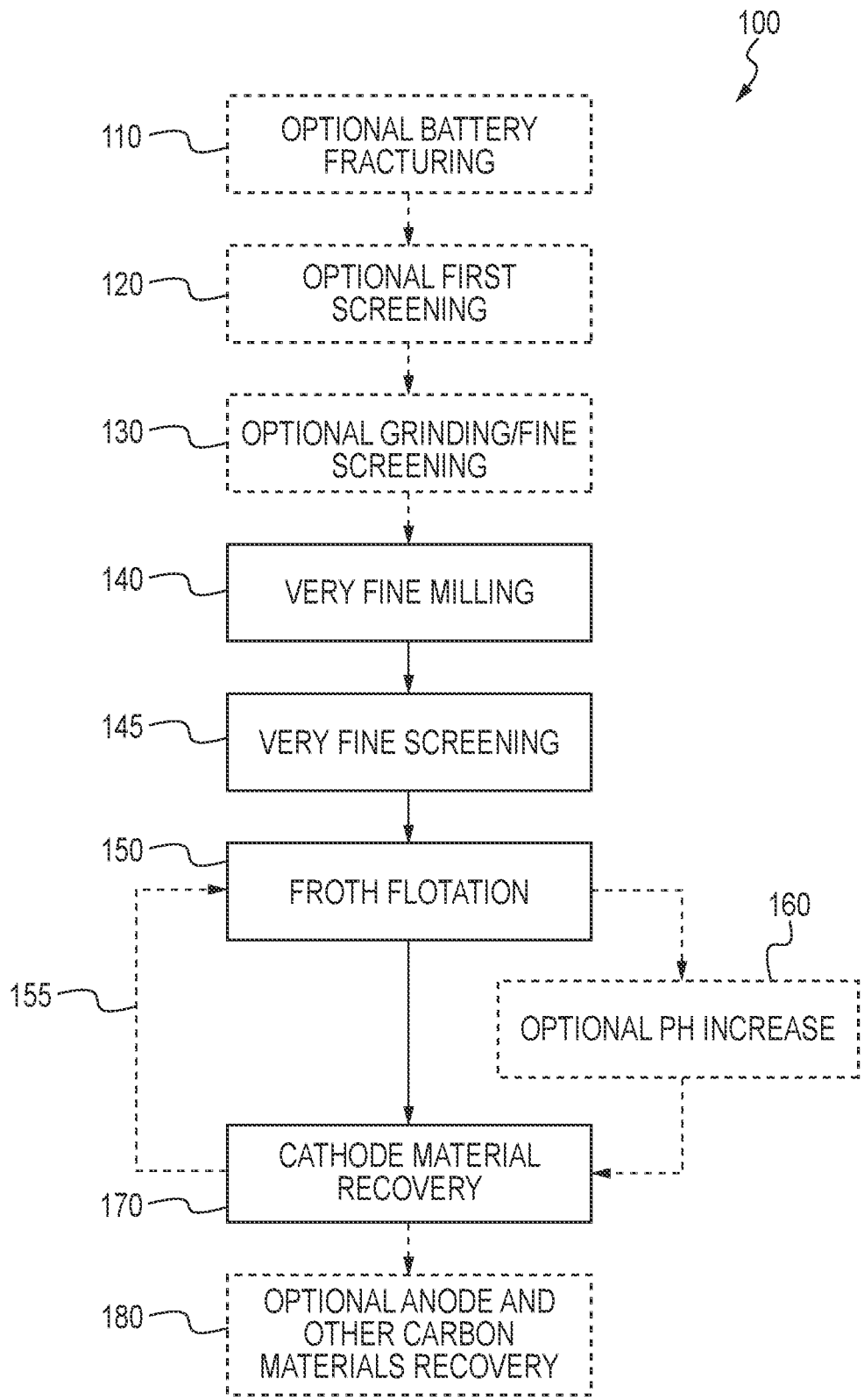

FLOTATION METHOD FOR RECOVERING LITHIUM-ION BATTERY CATHODE MATERIAL FROM RECYCLED LITHIUM-ION BATTERIES AND SCRAP

REFERENCE TO RELATED APPLICATIONS

This application claims the benefit of U.S. Provisional Application No. 63/345,175 entitled "Flotation Method for Recovering Lithium-Ion Battery Cathode Material from Recycled Lithium-Ion Batteries and Scrap" filed May 24, 2022, which is incorporated by reference in the entirety.

BACKGROUND

Lithium based batteries are widely used in all major applications for rechargeable and many non-rechargeable battery applications including automotive vehicles, mobile electronic devices, uninterruptable power supplies, robotic devices, and many more. A rechargeable lithium-ion battery depends on a cathode (positive electrode) containing a metal foil, generally an aluminum metal foil, coated with lithium metal oxide powder. The lithium metal oxide is conventionally provided as a lithium cobaltate; a lithium manganate; a mixture of nickel, manganese, and cobalt in various ratios (NMC); or a lithium iron phosphate (LFP). These different lithium cathode materials have different electrical and processing characteristics and vary in cost.

Although lithium-ion batteries have the highest energy density (Wh/kg) of currently used rechargeable batteries, there is ongoing demand to increase their energy density. For example, increasing the energy density of a lithium-ion battery increases the driving range for electric cars, allows smaller batteries in mobile phones, and thus increases the range or use time of all devices dependent on battery power.

The cathode material of a lithium-ion battery (LIB) makes up 20%-25% of the weight of the LIB and is coated on a metal foil to form the battery cathode. The anode and other carbon materials of the LIB constitute approximately 10% of the weight of the LIB and is coated on a metal foil, generally a copper metal foil, to form the battery anode.

The cathode materials vary considerably in metal composition, ranging from high cobalt compositions, such as the $LiCoO_2$ based cathode material used in electronic applications, to minimum cobalt and high nickel cathode compositions, such as the $LiNi_{0.8}Co_{0.1}Mn_{0.1}O_2$ and $LiNi_{0.6}Co_{0.2}Mn_{0.2}O_2$ based cathode material used in electric vehicle (EV) batteries. Other cathode compositions may contain alumina in addition to cobalt and nickel, such as the $LiNi_xCo_yAl_zO_2$ based cathode material where $x+y+z=1$. Additionally, there are various levels of manganese used in many commercial cathode materials, such as the $Li(Ni_{1/3} Mn_{1/3} Co_{1/3})O_2$ based cathode material used in consumer and EV batteries.

Finally, the cathode material of a LIB may primarily be lithium iron phosphate, thus not including significant quantities of the higher value nickel and cobalt metals. While LFP batteries have a lower energy density than NMC batteries, they have the advantage of being able to withstand more charge/discharge cycles than NMC batteries before failure. LFP batteries also offer reduced inherent flammability in relation to NMC batteries.

At present, NMC LIB's are primarily recycled to obtain isolated nickel and isolated cobalt in the form of smelter alloy or as separated cobalt and nickel salts from the cathodes and not in the form that the cathode material existed in the LIB's when the battery was new. LFP LIB's are not often recycled due to the low smelter value of iron in relation to nickel and cobalt. However, if the existent cathode material could be isolated economically without dilution by the anode and other carbon materials as intact cathode materials, such intact cathode material would not require digestion or smelting into an alloy or separation into isolated salts to be useful—instead being directly useful to make new battery cathodes.

In conventional recycling of NMC LIB's s, the separation of LIB's s with different cathode chemistries prior to crushing the batteries to form a black mass is usually not necessary—with the exception of eliminating LIB's s with lithium iron phosphate cathode material. The lithium iron phosphate cathode material is often considered to have little recovered value in relation to cobalt and nickel and thus is considered to function as a diluent of the desired cobalt and nickel metals. Thus, LIB's having lithium iron phosphate cathodes are considered less valuable for recycling.

For either NMC or LFP batteries, the black mass recovered from crushing the batteries includes a mixture of the cathode material, the anode and other carbon materials along with interfering binder. The current primary value of the black mass recovered from NMC batteries is based on the contained nickel and cobalt of the cathode material, providing the black mass is high enough in nickel and cobalt to be used in smelters to produce aerospace and other high alloy steels or as a feed alloy for hydro- and electro-chemical refining to produce cobalt and nickel metals and chemicals. If LFP batteries were recycled, the primary value of the recovered black mass would be based on the contained lithium content of the cathode material. However, for either NMC or LFP batteries, if the cathode material could be recovered from the black mass and used to make new battery cathodes without smelting to form elemental metals or hydro-metallurgically separated back to pure metal salts, the value of the recovered cathode material would be greatly enhanced.

In addition to the recovered black mass, the crushed batteries also provide potential value from any recovered copper foil used as the anode collector. The anode and other carbon materials potentially may have value if the anode and other carbon materials can be separated from the cathode material and isolated.

Conventional black mass as recovered from crushed LIB's s contains 40% to 45% anode and other carbon materials and interfering binder with the remaining 60% to 55% by weight being cathode material. The anode and other carbon materials in the conventional black mass include graphite, conductive carbon, and the like. Removal of the anode and other carbon materials and interfering binder from the cathode material during recycling of the LIB's would approximately double the recovered nickel and cobalt content of the cathode material and provide the option to directly reuse the recovered cathode material to make new batteries of either NMC or LFP type. Additionally, the ability to remove the anode and other carbon materials and interfering binder from the cathode material would encourage and make more desirable the commercial recycling of LIB's from mixed cathode batteries and older electric vehicle batteries (EV).

In the case of the recycling of current electric vehicle (EV) LIB production scrap and out of specification batteries from new EV LIB production as opposed to spent batteries, the recovered cathode material would have the same metal composition as is being used in the production of the new EV LIB's s. Thus, the removal of the anode and other carbon materials and interfering binder from the black mass originating from scrap and out of specification new batteries has the potential to produce a cathode material that could be directly reintroduced into the EV LIB production line, a major savings in comparison to conventional separate isolation of the nickel and cobalt alloys or salts. The difficulty lies in finding a relatively low-energy method to separate the cathode material from the anode and other carbon materials and the interfering binder without resorting to smelting or hydrometallurgical processing to produce relatively pure elemental metals.

In a prior attempt at a relatively low-energy flotation process to separate the cathode material from the anode and other carbon materials and interfering binder for LIB's including iron phosphate, as described in U.S. Pat. Nos. 8,616,475 and 8,882,007 to W. N. Smith and S. Swoffer, it was determined that the anode and other carbon materials floated together with the cathode material and that the anode and other carbon materials could not be separated from the cathode material with standard flotation methods.

The lack of separation was believed attributable to the relatively small amounts of binder adhering to the surface of the black mass cathode and carbon particles. In this prior process, the interfering binder surface coating was substantially eliminated from the anode and other carbon material and from the cathode material particles by subjecting the black mass to temperatures above 500° C. for more than 30 minutes to burn off the binder. Once the binder was burnt off at high temperature, it was possible to separate the anode and other carbon materials from the cathode material by flotation.

Without the high temperature heat treatment, the separation by froth flotation only occurred partially or not at all with standard flotation collectors such as kerosene or light hydrocarbon liquids as used in the flotation of graphite (similar to the anode carbon) and frothing agents such as methyl isobutyl carbinol (MIBC). The residual binder (usually Kynar, polyvinylidene difluoride-PVDF) was not destroyed until these high temperatures were reached, thus significantly increasing the energy necessary to perform the separation. An additional problem with this method arose during the high temperature treatment of the black mass in that the anode and other carbon materials ignited, causing a hazardous situation during high temperature processing. Therefore, the required high temperature heating to above 500° C. had to be performed under inert atmosphere to prevent the anode and other carbon materials from burning exothermically.

As can be seen from the above description, there is an ongoing need for simple and efficient materials and methods for isolating intact cathode material, especially lithium iron phosphate cathode material lacking significant smelter value, from spent LIB's and production scrap without the use of high temperatures and inert gas atmospheres. The materials and methods of the present invention overcome at least one of the disadvantages associated with conventional techniques.

SUMMARY

In one aspect, the invention provides a method of separating lithium-ion battery cathode material from anode and other carbon material from mixtures of cathode material, anode and other carbon material, and interfering binder, the method comprising: adding cathode and anode materials powder to an aqueous froth flotation cell comprising a froth flotation medium, the froth flotation medium comprising water, a hydrophilic depressant, a hydrocarbon collector, and a frothing agent; agitating the froth flotation cell medium to float the anode and other carbon materials to a top of the flotation cell; and recovering the cathode material from a bottom of the froth flotation cell to provide a recovered cathode material.

In another aspect, the invention provides a method of separating lithium-ion battery cathode material from anode and other carbon material from mixtures of cathode material, anode and other carbon material, and interfering binder, the method comprising: removing interfering binder from a powder comprising cathode material, anode and other carbon materials, and interfering binder to provide a cathode and the anode materials powder, where the cathode and the anode materials powder comprises at least 90% by weight cathode material and anode and other carbon materials; adding the cathode and anode materials powder to an aqueous froth flotation cell comprising a froth flotation medium, the froth flotation medium comprising water, a hydrocarbon collector, and a frothing agent; agitating the froth flotation cell medium to float the anode and other carbon materials to a top of the flotation cell; and recovering the cathode material from a bottom of the froth flotation cell to provide a recovered cathode material.

In another aspect of the invention, a cathode material is recovered, and in another aspect, a new lithium-ion battery including the recovered cathode material is provided.

Other methods, features, and advantages of the invention will be, or will become, apparent to one with skill in the art upon examination of the following FIGURES and detailed description. It is intended that all such additional methods, features, and advantages be included within this description, be within the scope of the invention, and be protected by the claims that follow. The scope of the present invention is defined solely by the appended claims and is not affected by the statements within this summary.

BRIEF DESCRIPTION OF THE FIGURES

The invention can be better understood with reference to the following drawings and description.

FIG. 1 represents a flotation process for separating cathode material from LIB black mass.

DETAILED DESCRIPTION

A flotation method for separating cathode material from anode and other carbon materials is described. The cathode material may be that including lithium, nickel, and cobalt or that including lithium iron phosphate. The flotation method does not require pretreatment of the starting material with temperatures above 500° C. nor an inert atmosphere to prevent burning. The starting material for the flotation process is conventional black mass as recovered from fractured lithium-ion batteries and lithium-ion battery production scrap. The fractured lithium-ion batteries may originate from spent batteries including used batteries and/or out of specification new production batteries. A very fine mesh screening preferably is used to remove interfering binder from the black mass powder prior to froth flotation, preferably in combination with a hydrophilic depressant to enhance separation of the cathode material from the anode and other carbon materials present in the black mass. The separated cathode and anode materials recovered from the method may be used directly or augmented with additional lithium to form new LIB cathodes, anodes, and batteries.

FIG. 1 represents a flotation method 100 for separating cathode material from LIB black mass.

In optional battery fracturing 110, spent LIB batteries and/or production scrap is fractured by shredding, chopping, grinding, hammer milling, or the like to produce a fractured mixture including larger battery pieces and a granular powder. The fracturing may be performed dry or with a water spray, depending on the type of fracturing used. The resulting fractured mixture of larger pieces and granular powder includes battery case pieces, copper and aluminum foil pieces, plastic pieces, and battery separator pieces that may be plastic or fiberglass as the larger pieces; and a granular powder including the anode and other carbon materials and the cathode material.

In optional first screening 120, the fractured mixture is screened, preferably using a 30 to 40 mesh screen, to isolate the larger pieces of copper and aluminum metal, plastic, and separators from the resulting granular powder. The optional first screening 120 may be performed dry or with water by slurrying the larger pieces and the powder in water before screening. While not represented in the FIGURE, the larger pieces of copper and aluminum metal, plastic, and separators may be washed with water to recover powder adhered to the larger pieces to obtain additional granular powder.

In optional grinding 130, the granular powder may be milled, ground, or run through blender type size reduction equipment until the material passes through a fine screen having a mesh from 60 to 100 (approximately 250 to 149 microns) to produce a black mass in the form of a fine screened powder. The primary purpose of the optional milling 130 is to remove copper, separator pieces, and aluminum impurities. This fine screening may be performed wet or dry, with dry screening preferred to minimize the water used in the process. The oversize material that does not pass through the fine screen is primarily interfering binder, metal pieces, and separator material, which may be discarded.

In very fine milling 140, the granular powder from the optional first screening 120 or preferably the fine screened powder from the optional grinding 130 is separated from the relatively small amount of remaining interfering binder. The very fine milling 140 removes interfering binder remaining bound to the granular or fine screened powder to produce a very fine milled powder, as the interfering binder forms "clumps" during the very fine milling and does not further reduce in size.

In very fine screening 145, the resulting very fine milled powder is then screened with a very fine screen, thus an at least 200-mesh and preferably a 325-mesh screen, to provide a very fine screened powder lacking the clumps of interfering binder. The 200-mesh screen allows particles smaller than 74 microns to pass through the screen, while retaining larger particles on the screen surface. The 325-mesh screen allows particles smaller than 44 microns to pass, while retaining larger particles on the screen surface. The very fine screened powder is a cathode and anode materials powder including at least 90% by weight cathode material and anode and other carbon materials, and preferably includes at least 98% by weight cathode material and anode and other carbon materials.

This very fine screening 145 may be performed wet or dry, with dry screening preferred to minimize the water used in the process. Larger particles retained on the screen may again be subjected to the very fine milling 140 to recover additional cathode material. Thus, unlike conventional methods where a coarser screen, such as a 140-mesh screen, is used that may or may not produce a relatively small amount of −200 mesh or less screened material, the very fine screening 145 passes material that is 74 microns and less and preferably only passes material that is 44 microns and less.

As any small bits of interfering binder substantially do not pass through the very fine mesh screen used during the very fine screening 145 and generally roll into small clumps on top of the very fine processing screen, the remaining interfering binder may be mechanically removed as oversized material from the surface of the screens. The interfering binder (often Kynar) primarily takes the form of fine balls during the very fine milling 140 that do not pass through the very fine screen. Thus, the very fine milling 140 is used to remove traces of interfering binder otherwise remaining on the surface of the granular powder from the optional first screening 120 or from the surface of the fine screened powder from the optional milling 130, and when used, the very fine screening 145 allows remaining interfering binder clumps to be mechanically removed before further processing.

In froth flotation 150, the very fine screened powder from the very fine milling/screening 140/145 is subjected to froth flotation to separate the cathode material from the anode and other carbon materials. If the interfering binder was not previously removed from the surface of the powder, the cathode material will float along with the anode and other carbon materials, thus reducing recovery of the cathode material and contaminating the recovered anode and other carbon materials with cathode material.

In the froth flotation 150, the very fine screened powder is added to a froth flotation cell including a froth flotation medium including water and preferably a hydrophilic depressant. Suitable froth flotation cells may be obtained from Metso Outotec, Canada. A hydrocarbon collector and frothing agent are also added to the froth flotation cell.

The froth flotation cell is agitated, and gas is introduced at the bottom of the flotation cell to form bubbles and cause the anode and other carbon materials to rise to the top of the flotation cell where they may be collected as "overflow floats". The gas is preferably air, but other gases that do not interfere with the separation, such as nitrogen, may be used. The gas flow rate is adjusted to provide substantially steady foaming, thus allowing the foam to flow over the collection edge of the flotation cell. As the anode and other carbon materials float, the cathode material sinks to the bottom of the flotation cell and may be collected as the "sinks".

The froth flotation 150 preferably uses hydrocarbon collectors such as ligroin, kerosene, combinations thereof, and other higher boiling hydrocarbons that are not water soluble. The preferred collector is a liquid-phase hydrocarbon at room temperature with a boiling point greater than degrees C., preferably greater than 150° C., for safety reasons, although lower boiling hydrocarbon liquids may be used. Standard kerosene (boiling point 200° C.) is very effective in the 0.5% to 2% range by weight in relation to the total weight of the very fine screened powder being processed.

The froth flotation preferably uses frothers or foaming agents in combination with the collector. Preferable frothers are polymeric alcohols having a molecular weight greater than 90. Preferable frothers include methyl isobutyl carbinol (MIBC), isooctanol, 2-hexanol, polyethylene oxide alcohols, and commercial silicone frothers, such as Dow Froth C602, Dow Froth 250, and NASACO DF 400col, and combinations thereof. Other frothers may be used. At present, the preferred frother for use with kerosene as a collector is MIBC.

However, with these collectors and frothers, the froth flotation may not be sufficiently selective between the cathode material powder and the anode and other carbon materials powder. To provide the desired selectivity to the froth flotation, a hydrophilic depressant may be added to increase the hydrophilicity of the surface of the cathode material powder, which is believed to better enable the cathode material powder to aggregate and sink during the froth flotation. The hydrophilic depressant preferably enhances selectivity between the cathode material powder and the anode and other carbon materials powder to at least 80%, more preferably to at least 90%, and most preferably to at least 95%. Thus, at the at least 80% selectivity level at least 80% by weight of the powder that sinks during the froth flotation is cathode material powder and at least 80% by weight of the powder that floats and flows over the collection edge of the flotation cell is anode and other carbon materials powder.

The hydrophilic depressant preferably constitutes from 0.02% to 0.8% by weight of the very fine screened powder being processed. Useful hydrophilic depressants are believed to assist in impeding the cathode material from floating with the anode and other carbon materials. While not wishing to be bound by any particular theory, this is believed to occur through the transition metals of the cathode material complexing with the hydrophilic depressant.

Preferable hydrophilic depressants have molecular weights of <10,000 and may or may not have polar functional groups. More preferably hydrophilic depressants have molecular weights of <10,000, are hydrophilic, and are polar. Useful hydrophilic depressants include polyacrylic acids and their salts, polycarboxylic acids and their salts having molecular weights (MW) from 200 to 2500, polyacrylic-co-maleic acid, organic poly-thio sulfides in the MW range from 200-1000, citric acid and its salts, oxalic acid and its salts, succinic acid and its salts, glycolic acid and its salts, polyvinyl alcohols in the MW range from 300 to 3000, starches, sugars, dextrin, carboxymethyl cellulose, silicates, poly(trimethoxy) silanes, polyacrylamides, transition metal complexing molecules having molecular weights <10,000, preferably <4,000 with polar groups, and combinations thereof. More preferred hydrophilic depressants are polyacrylic acids and their salts, polycarboxylic acids and their salts having molecular weights (MW) from 300 to 2000, and combinations thereof. A more preferred at present hydrophilic depressant is the sodium salt of polyacrylic acid with a molecular weight (MW) of 2,000.

In optional second froth flotation 155, a second sequential stage of froth flotation may be used to increase the yield of the recovered cathode materials by re-frothing the cathode material recovered from the froth flotation 150. Thus, two sequential stages of froth flotation are preferred to isolate additional cathode material from the anode and other carbon materials, thus increasing the yield of cathode material from the separation.

In optional pH increase 160, the pH of the froth flotation medium may be adjusted to a pH from 8 to 11, preferably to a pH from 8 to 9, with a base to enhance separation of the cathode material from the anode and other carbon materials. In the event additional lithium is being added to the cathode material, as discussed further below, a lithium base may be used to increase the pH of the froth flotation medium. The lithium base is preferably lithium hydroxide, lithium carbonate, or combinations thereof, and more preferably lithium hydroxide. In the event additional lithium is not being added to the cathode material, such as when the recovered cathode material is not being used to make new battery cathodes, a non-lithium hydroxide base may be used due to the lower cost, preferably sodium hydroxide.

In cathode material recovery 170, the precipitated cathode material remaining in the bottom (sinks) of the flotation cell are recovered as >95% pure cathode material. The precipitated cathode material may then be collected and heated to dryness, such as by heating to >400° C. The resultant dried cathode material may then be ground and/or screened to obtain the desired particle size for the recovered cathode material.

The recovered cathode material preferably includes approximately twice the concentration of nickel and cobalt in relation to the original black mass starting material including the anode and other carbon materials and the interfering binder. Thus, in the event isolation of the nickel, manganese, and cobalt as opposed to cathode material is desired, the isolation of the separate metals is significantly easier after performing the method 100 due to the relatively high concentration of the desired nickel and cobalt in relation to the black mass starting material.

When the starting material is black mass arising from out of specification EV LIB battery production or EV battery production scrap, the cathode material recovered from the method 100 will have the same ratio of nickel, to manganese, to cobalt as the virgin cathode material used to produce the EV LIBs—other than a 4-15% loss by weight due to the froth flotation. Thus, the recovered cathode material from these non-spent battery black mass starting materials may be used by the original cathode manufacturer by adding a relatively small amount of lithium as lithium hydroxide or lithium carbonate to compensate for the 4-15% loss to reproduce the virgin cathode material being used for EV LIB production. Generally, the amount of added lithium required to restore the cathode material to its original metal ratios is 0.1% to 2% of the total weight of the cathode material, thus restoring the stochiometric amount of lithium in relation to cobalt for full performance of the new cathode material produced from the recovered cathode material.

Regardless of the source of the recovered cathode material, for direct use to form new LIB cathodes, the recovered cathode material may be analyzed for lithium to other metals content. This analysis may be performed for other metals, for example by inductively coupled plasma analysis (ICP), and for lithium, for example, by ICP or atomic absorption spectroscopy (AA). If the molar ratio of lithium to the other metals present in the recovered cathode material is less than 0.98 to 1.12, preferably less than 1, additional lithium may be added, preferably in the form of lithium hydroxide or lithium carbonate. The additional lithium is added to increase the lithium to other non-lithium metals ratio into a molar ratio range from 1.0 to 1.1, preferably from 1.03 to 1.06.

A cathode for a LIB may be formed from the recovered cathode material by adding the recovered cathode material, with optional additional lithium, to N-methyl pyrrolidone (NMP) containing dissolved Kynar binder along with conductive carbon powder, such as "BP pearls". This slurry is heated and stirred at high shear rates to ensure homogeneity. The resulting slurry is then coated on thin aluminum foil with a knife coater or related technique to form an even coating of the cathode material on the foil and is preferably dried to achieve an approximate 250 micrometer coating on the foil. This coated aluminum foil may then be cut to the desired size for the cathode of a LIB. The cathode may be used in either prismatic or continuous rolled cylindrical LIBs.

In optional anode and other carbon materials recovery 180, the floated anode and other carbon materials are recovered and preferably washed with an acid, preferably sulfuric acid having a pH from 0.5 to 2, preferably including a reducing agent, such as sulfur dioxide, to remove remaining traces of metal contaminants. The anode and other carbon materials resulting from this acidic reduction may then be subjected to a very fine screening using a very fine mesh screen to produce high purity anode carbon. This very fine screening may be performed wet or dry, with dry screening preferred to minimize the water used in the process. Optionally, the resulting high purity anode carbon resulting from the very fine screening may be dried.

An anode for a LIB may be formed from the recovered anode and other carbon materials by adding the recovered anode and other carbon materials to N-methyl pyrrolidone (NMP) containing dissolved Kynar binder along with 10% conductive carbon powder, such as "BP pearls". An aqueous organic binder, such as PVOH or a polyacrylate, also may be used as the binder. The slurry is heated and stirred at high shear rates to ensure homogeneity. The resulting slurry is then coated on thin copper foil with a knife coater or related technique to form an even coating of the anode and other carbon materials on the foil and is preferably dried to achieve an approximate 250 micrometer coating on the foil. This coated copper foil may then be cut to the desired size for the anode of a LIB. The anode may be used in either prismatic or continuous rolled cylindrical LIBs.

In addition to use in forming new anodes for LIB's s, the recovered high purity anode and other carbon materials can also be used as conductive carbon, which is used in many applications in addition to anodes, such as battery components other than anodes, conductive polymers, and conductive coatings.

A new LIB battery including the cathode and anode formed from the recovered materials may be formed by placing a thin separator of polypropylene, polyethylene, or a mixture of these inert polymers between the anode and cathode to form an initial cell. Several alternating layers of these initial cells can be stacked and then inserted into and sealed in a cell pouch or in a cylindrical or other shaped can. An organic electrolyte containing a lithium salt, such as lithium hexafluorophosphate, may then be added to the initial cells and sealed with two separate protruding electrodes, a positive cathode and a negative anode, to form the LIB. The LIB may be connected to an initial charge/discharge cycle for the initial formation charge step to prepare the battery for service and to complete the process of forming a new LIB.

The following examples illustrate one or more preferred embodiments of the invention. Numerous variations may be made to the following examples that lie within the scope of the invention.

EXAMPLES

Example 1: Cathode Material Separation Process

A 500-ml flotation cell was filled with 500 ml water and 66 g of −325 mesh LIB cathode/anode carbon commercial black mass mixture obtained from crushing spent LIB's s. The resulting black mass mixture was previously run through a blender and screened through −120 mesh then screened further through −325 mesh. The oversize in each screen was run through the blender to totally separate the cathode and carbon particles from the small bits of rubbery Kynar binder, which did not reduce and pass through the −325 screen. All resultant powders were then screened through −325 mesh and combined. The +325 mesh reject material at this point was 15% of the original weight and consisted of small rolls of binder resin, metal pieces from battery contacts and casings and some cathode material and anode and other carbon materials. Approximately 10%-12% of the 15% was believed to be the binder.

The slurry was added to a Metso Denver D-12 flotation cell and was stirred at a high rate and 0.86 g of a 50% aqueous solution of sodium salt of polyacrylic acid (MW 2000) was added and the slurry was conditioned for 10 minutes. Then the pH was adjusted to 10.5 with the addition of a few drops of aqueous lithium hydroxide. Then after 5 minutes, 0.77 g of kerosene was added in addition to 0.68 g MIBC. This slurry was conditioned for 20 minutes and then the stirring was reduced to maintain a slight turbulence at the surface of the flotation cell column.

The gas (air) was then slowly turned on to provide a steady bubble column through the dispersing tube and cause fine bubbles to form at the bottom of the cell and slowly carry the anode carbon and conductive carbon and any residual binder in the cell slurry up to the top of the cell on the surface of the bubbles. This black foam/froth was allowed to overflow from the cell and was then collected and filtered to provide the separated floated anode and other carbon. After 50 minutes the surface of the bubbles became darker and the bubbles finer and the graphite slowly disappeared from the froth surface over the next 30 minutes and the anode carbon overflow (float) was filtered and dried and weighed 27.85 g. The sink slurry remaining in the flotation cell was filtered and dried and weighed 34.12 g. The recovered material balance was 94%. The recovered anode and other carbon material was 44.9% of the overall yield with a theorical amount of 44% based on previous hydrometallurgical processing extraction techniques. The overall yield of cathode material was based on the expected 58% total of Ni plus Mn plus Co metals as calculated for the starting cathode material. The yield based on the obtained cathode material weight with the expected total Ni plus Mn plus Co analysis was 95% by weight.

Analysis of the anode carbon showed; <0.1% Carbon by weight; <0.1% Mn by weight; <0.05% Ni by weight.

Analysis of the cathode material showed; <1.0% Carbon by weight; 22.8% Ni by weight; 19.3% Mn by weight; and 16.5% Co by weight for a total of 58.6%.

Combined $Ni^+$, $Mn^+$, and Co was equal to or greater to 58% by weight of the recovered cathode material with the amount of each metal being recovered responsive to the cathode chemistry of the starting black mass or production scrap.

To provide a clear and more consistent understanding of the specification and claims of this application, the following definitions are provided.

Spent LIB batteries are batteries that are discarded due to a loss of the ability to be sufficiently recharged for reuse or have totally malfunctioned.

Molecular weight is used to express relative molecular mass and is a measure of the sum of the atomic weight values of the molecules being addressed. As used herein, molecular weight is unitless. The difference in the average molecular weight of an element and the weight of a specific isotope of that element is not relevant in the present context.

Unless otherwise indicated, all numbers expressing quantities of ingredients, percentages of ingredients, and the like used in the specification and claims are to be understood as indicating both the exact values as shown and as being modified by the term "about". Thus, unless indicated to the contrary, the numerical values of the specification and claims are approximations that may vary depending on the desired properties sought to be obtained and the margin of error in determining the values. At the very least, and not as an attempt to limit the application of the doctrine of equivalents to the scope of the claims, each numerical parameter should at least be construed considering the margin of error, the number of reported significant digits, and by applying ordinary rounding techniques.

Unless the context clearly dictates otherwise, where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the upper and lower limits, ranges excluding either or both of those included limits are also included in the invention.

The terms "a", "an", and "the" used in the specification claims are to be construed to cover both the singular and the plural, unless otherwise indicated or contradicted by context. No language in the specification should be construed as indicating any non-claimed element to be essential to the practice of the invention.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

While various aspects of the invention are described, it will be apparent to those of ordinary skill in the art that other embodiments and implementations are possible within the scope of the invention. Accordingly, the invention is not to be restricted except considering the attached claims and their equivalents.

The invention claimed is:

1. A method of separating lithium-ion battery cathode material from anode and other carbon material from mixtures of cathode material, anode and other carbon material, and interfering binder, the method comprising:
   removing interfering binder from a powder comprising cathode material, anode and other carbon materials, and interfering binder to provide cathode and anode materials powder, where the cathode and the anode materials powder comprises at least 90% by weight cathode material and anode and other carbon materials;
   adding the cathode and the anode materials powder to an aqueous froth flotation cell comprising a froth flotation medium, the froth flotation medium comprising water, a hydrophilic depressant, a hydrocarbon collector, and a frothing agent;
   agitating the froth flotation cell medium to float the anode and other carbon materials to a top of the flotation cell; and
   recovering the cathode material from a bottom of the froth flotation cell to provide a recovered cathode material.

2. The method of claim 1, where the cathode material comprises iron phosphate.

3. The method of claim 1, where the cathode material comprises nickel and cobalt.

4. The method of claim 1, where interfering binder adhered to the cathode material is removed from the cathode material.

5. The method of claim 1, where interfering binder adhered to the anode and other carbon materials is removed from the anode and other carbon materials.

6. The method of claim 1, where the removing the interfering binder comprises very fine milling to produce a very fine milled powder that is the cathode and anode materials powder.

7. The method of claim 1, where the removing the interfering binder comprises very fine milling and very fine screening to produce a very fine screened powder that is the cathode and anode materials powder.

8. The method of claim 7, where the very fine screening uses a 200-mesh screen.

9. The method of claim 7, where the very fine screening uses a 325-mesh screen.

10. The method of claim 7, where the very fine screened powder consists essentially of particles smaller than 74 microns.

11. The method of claim 7, where the very fine screened powder consists essentially of particles smaller than 44 microns.

12. The method of claim 1, where the powder comprising cathode material, anode and other carbon materials, and interfering binder originates from lithium-ion battery production scrap.

13. The method of claim 1, where the powder comprising cathode material, anode and other carbon materials, and interfering binder originates from lithium-ion battery production scrap.

14. The method of claim 13, further comprising before removing the interfering binder, grinding and screening through a fine screen having a mesh from 60 to 100 a granular powder originating from spent or out of specification new production lithium-ion batteries, and producing a fine screened powder.

15. The method of claim 14, where copper, separator pieces, and aluminum impurities are removed from the fine screened powder.

16. The method of claim 14, further comprising before producing the fine screened powder, first screening a fractured mixture with a 30 to 40 mesh screen to produce the granular powder.

17. The method of claim 16, where larger pieces of copper and aluminum metal, plastic separators are separated from the granular powder.

18. The method of claim 16, further comprising before producing the granular powder, fracturing the spent or out of specification new production lithium-ion batteries.

19. The method of claim 1, where the agitating is performed by introducing gas to the bottom of the froth flotation cell.

20. The method of claim 19, where the gas is air.

21. The method of claim 1, where the hydrocarbon collector constitutes from 0.5% to 2% by weight of the cathode and anode materials powder.

22. The method of claim 1, where the hydrocarbon collector is a liquid-phase hydrocarbon at room temperature that is not water soluble and has a boiling point greater than 80 degrees C.

23. The method of claim 1, where the hydrocarbon collector is chosen from ligroin, kerosene, and combinations thereof.

24. The method of claim 1, where the hydrocarbon collector is kerosene.

25. The method of claim 1, where the frothing agent is a polymeric alcohol having a molecular weight greater than 90.

26. The method of claim 1, where the frothing agent is chosen from methyl isobutyl carbinol (MIBC), isooctanol, 2-hexanol, polyethylene oxide alcohols, commercial silicone frothers, and combinations thereof.

27. The method of claim 1, where the frothing agent is methyl isobutyl carbinol.

28. The method of claim 1, where the hydrophilic depressant constitutes from 0.02% to 0.8% by weight of the cathode and anode materials powder.

29. The method of claim 1, where selectivity between the cathode material and the anode and other carbon materials is at least 80% by weight of a combined weight of the cathode material and the anode and other carbon materials.

30. The method of claim 1, where the hydrophilic depressant has a molecular weight of <10,000 and comprises polar functional groups.

31. The method of claim 1, where the hydrophilic depressant is chosen from polyacrylic acids and their salts, polycarboxylic acids and their salts having molecular weights (MW) from 200 to 2500, polyacrylic-co-maleic acid, organic poly-thio sulfides in the MW range from 200-1000, citric acid and its salts, oxalic acid and its salts, succinic acid and its salts, glycolic acid and its salts, polyvinyl alcohols in the MW range from 300 to 3000, starches, sugars, dextrin, carboxymethyl cellulose, silicates, poly(trimethoxy) silanes, polyacrylamides, transition metal complexing molecules having molecular weights <10,000, and combinations thereof.

32. The method of claim 1, where the hydrophilic depressant is chosen from polyacrylic acids and their salts, polycarboxylic acids and their salts having molecular weights (MW) from 300 to 2000, and combinations thereof.

33. The method of claim 1, where the hydrophilic depressant is a sodium salt of polyacrylic acid with a molecular weight (MW) of 2,000.

34. The method of claim 1, further comprising subjecting recovered material from the bottom of the froth flotation cell to a second froth flotation to further separate the cathode material from the anode and other materials.

35. The method of claim 1, further comprising increasing a pH of the froth flotation medium to a pH from 8 to 11 with a base.

36. The method of claim 35, where the base is a lithium base.

37. The method of claim 35, where the base is chosen from lithium hydroxide, lithium carbonate, and combinations thereof.

38. The method of claim 35, where the base is a non-lithium hydroxide base.

39. The method of claim 1, further comprising heating to dryness, grinding, and screening the cathode material from the bottom of the froth flotation cell.

40. The method of claim 1, further comprising recovering the anode and other carbon materials from the top of the flotation cell to provide recovered anode and other carbon materials.

41. The method of claim 40, further comprising washing the recovered anode and other carbon materials with an acid and a reducing agent.

42. The method of claim 41, where the acid is sulfuric acid having a pH from 0.5 to 2 and the reducing agent is sulfur dioxide.

43. The method of claim 41, further comprising very fine screening the anode and other carbon materials from the top of the flotation cell.

* * * * *